(12) United States Patent
Li

(10) Patent No.: US 11,275,676 B2
(45) Date of Patent: Mar. 15, 2022

(54) CONSTRAINT GUIDED HYBRID FUZZING TEST SYSTEM FOR APPLICATION PROGRAMS

(71) Applicant: Baidu USA LLC, Sunnyvale, CA (US)

(72) Inventor: Peng Li, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 16/849,127

(22) Filed: Apr. 15, 2020

(65) Prior Publication Data
US 2021/0326246 A1 Oct. 21, 2021

(51) Int. Cl.
*G06F 11/36* (2006.01)
*G06F 21/14* (2013.01)

(52) U.S. Cl.
CPC ...... *G06F 11/3688* (2013.01); *G06F 11/3608* (2013.01); *G06F 11/3684* (2013.01); *G06F 11/3692* (2013.01); *G06F 21/14* (2013.01)

(58) Field of Classification Search
CPC ............. G06F 11/3688; G06F 11/3692; G06F 11/3684; G06F 21/14; G06F 11/3608
USPC .................................................. 717/124–135
See application file for complete search history.

(56) References Cited

U.S. PATENT DOCUMENTS

| | | | |
|---|---|---|---|
| 2006/0010431 A1* | 1/2006 | Patil | G06F 8/52 717/131 |
| 2012/0054552 A1* | 3/2012 | Artzi | G06F 11/3684 714/38.1 |
| 2012/0089868 A1* | 4/2012 | Meijer | G06F 11/076 714/26 |
| 2015/0026669 A1* | 1/2015 | Eddington | G06F 21/577 717/137 |
| 2019/0384697 A1* | 12/2019 | Phan | G06F 11/3676 |

OTHER PUBLICATIONS

Bounimova, Ella, Patrice Godefroid, and David Molnar. "Billions and billions of constraints: Whitebox fuzz testing in production." 2013 35th International Conference on Software Engineering (ICSE). IEEE, 2013.pp.122-131 (Year: 2013).*

Godefroid, Patrice, et al. "Automating software testing using program analysis." IEEE software 25.5 (2008): pp. 30-37. (Year: 2008).*

(Continued)

*Primary Examiner* — Satish Rampuria
(74) *Attorney, Agent, or Firm* — Womble Bond Dickinson (US) LLP

(57) ABSTRACT

Embodiments disclose a system/method for constraint-guided hybrid fuzzing. According to one embodiment, a system performs a grey box fuzzing for a program code, where the performing mutates an initial seed input to generate a first set of seed inputs. The system performs a concolic execution for the program code using the first set of seed inputs to generate a second set of seed inputs. The system determines constraint information associated with the second set of seed inputs by analyzing the concolic execution. The system performs one or more modified grey box fuzzing based on the second set of seed inputs bounded to the constraint information. That way the bounded portion of the second set of seed inputs are not mutated by the grey box fuzzing.

21 Claims, 5 Drawing Sheets

(56) References Cited

OTHER PUBLICATIONS

Pak, Brian S. "Hybrid fuzz testing: Discovering software bugs via fuzzing and symbolic execution." School of Computer Science Carnegie Mellon University (2012).pp.1-80 (Year: 2012).*

Böhme, Marcel, et al. "Directed greybox fuzzing." Proceedings of the 2017 ACM SIGSAC Conference on Computerand Communications Security. 2017.pp. 2329-2344 (Year: 2017).*

Böhme, Marcel, Van-Thuan Pham, and Abhik Roychoudhury. "Coverage-based greybox fuzzing as markov chain." IEEE Transactions on Software Engineering 45.5 (2017): pp. 489-506. (Year: 2017).*

Pham, Van-Thuan, et al. "Smart greybox fuzzing." IEEE Transactions on Software Engineering (2019).pp. 1980-1997 (Year: 2019).*

* cited by examiner

CONSTRAINT GUIDED HYBRID FUZZING TEST SYSTEM FOR APPLICATION PROGRAMS

TECHNICAL FIELD

Embodiments of the invention relate generally to secure multiparty computing. More particularly, embodiments of the invention relate to a constraint guided hybrid test system for application programs.

BACKGROUND

Hybrid fuzz testing leverages both fuzz testing (or fuzzing) and concolic execution to improve code coverage over either one of the approaches alone. For example, grey box fuzzing can utilize seeds generated by concolic execution through solving constraints to explore code regions guarded with complex conditionals or checksums. However, existing hybrid fuzzing systems are not able to make optimal use of concolic execution as the solved constraints are still mutated by grey box fuzzing which reducing fuzzing efficiency.

Current hybrid testing methods include Driller: augmenting fuzzing through selective symbolic execution, QSYM: a practical concolic execution engine tailored for hybrid fuzzing; and probabilistic path prioritization for hybrid fuzzing. These coverage-centric hybrids fuzzing methods all suffer from the problems mentioned above.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be constructed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments disclose a system/method for constraint-guided hybrid fuzzing. According to one embodiment, a system performs a grey box fuzzing for a program code, where the performing mutates an initial seed input to generate a first set of seed inputs. The system performs a concolic execution for the program code using the first set of seed inputs to generate a second set of seed inputs. The system determines constraint information associated with the second set of seed inputs by analyzing the concolic execution. The system performs one or more modified grey box fuzzing based on the second set of seed inputs bounded to the constraint information. That way the bounded portion of the second set of seed inputs are not mutated by the grey box fuzzing.

Figure 1:
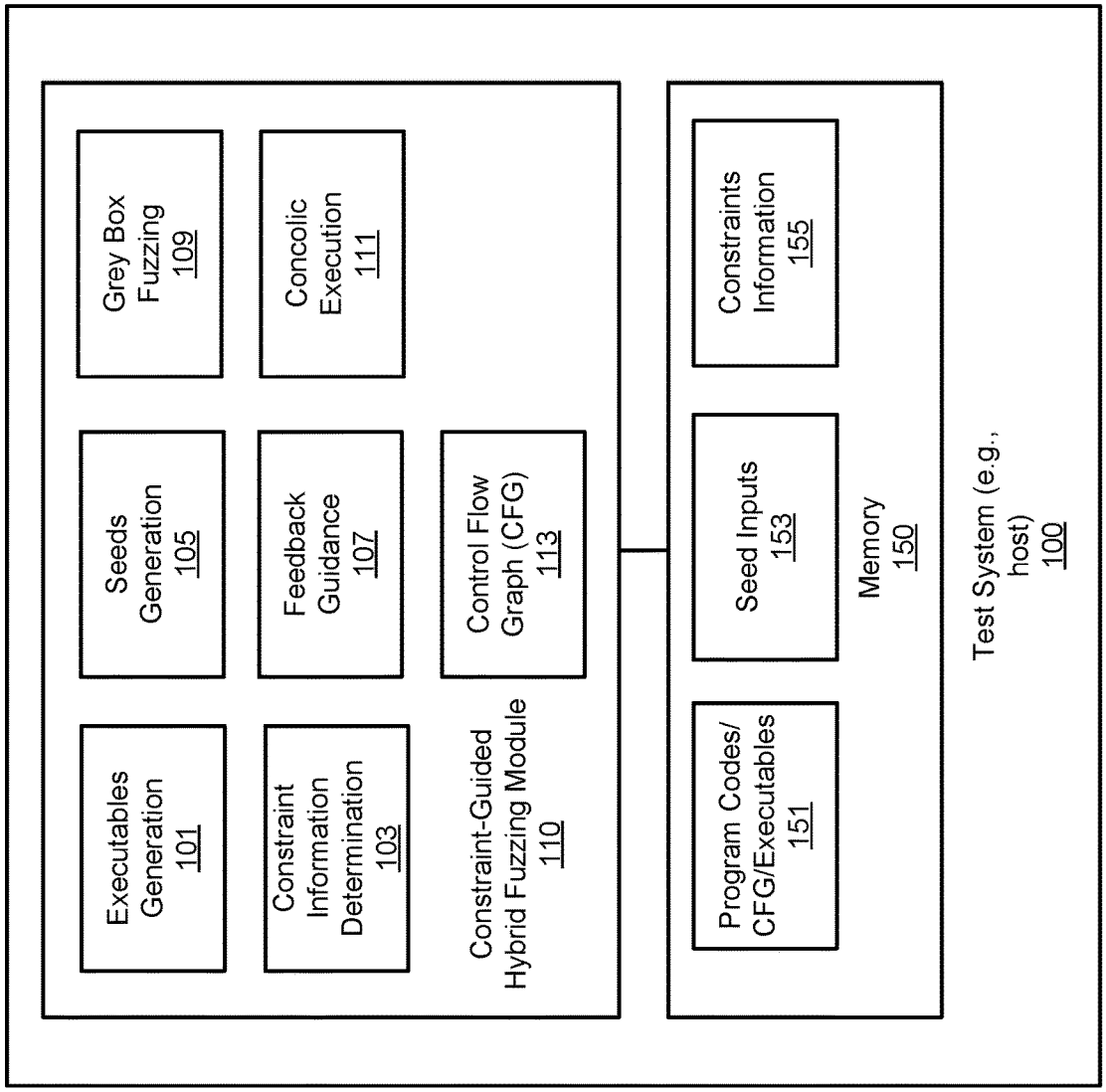
FIG. 1 is a block diagram illustrating a test system according to one embodiment.

FIG. 1 is a block diagram illustrating a test system according to one embodiment. Referring to FIG. 1, test system (e.g., host) 100 may be any kind of computing system, including a server or a cluster of servers, such as Web or cloud servers, application servers, backend servers, or a combination thereof. In another embodiment, system 100 may be any type of devices such as a personal computer (e.g., desktops, laptops, and tablets), a "thin" client, a personal digital assistant (PDA), a Web enabled appliance, a Smartwatch, or a mobile phone (e.g., Smartphone), etc. System 100 can include an interface to allow a client to access resources or services provided by system 100. Examples of services can include bug/vulnerability analysis, fuzz testing, concolic execution, prioritized hybrid fuzz testing, and constraint-guided hybrid fuzz testing services for software program applications. System 100 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

System 100 can include constraint-guided hybrid fuzzing module 110 which can include various submodules such as executable generation 101, constraint information determination 103, seeds generation 105, feedback guidance 107, grey box fuzzing 109, and concolic execution 111. Executable generation 101 can generate binary executables for program application source codes. The binary executables can include test instrumentations to trace code executions. Executable generation 101 can optionally generate intermediate representations for program application source codes. Constraint information determination 103 can analyze and determine constraints (as part of constraint information) based on concolic executions. Seeds generation 105 can generate seeds for fuzzing. Seeds can be generated by mutations or by analyzing constraint information. Feedback guidance 107 can guide the execution of, and feed information between, one or more fuzzing/fuzzer and/or concolic execution instances. Grey box fuzzing 109 can perform a fuzzing (e.g., black box, grey box, or white box fuzzing) for a software application program to generate one or more seed inputs. Concolic execution 111 can perform a concolic execution for a software application program based on one or more seed inputs. Note, grey box fuzzing refers to a coverage guided fuzzing, thus, grey box fuzzing can prioritize randomized generation of seed inputs that explore new control paths of an application program. Examples of randomized generations include mutations for seed inputs, such as swap bytes, reverse bits of the seed inputs, etc.

Control flow graph (CFG) 113 can generate or map a graph of different paths or control flows from one basic block (BB) to another for a software program. Here, a BB refers to a source line sequence with no branches-in except to the entry and no branches-out except at the exit. The BB can form vertices or nodes in a control flow graph (CFG). A CFG refers to a representation, using graph notation, of all paths that might be traversed through an application program during its execution. For a CFG, each node can be a BB terminated in a conditional statement. Each edge can be a boolean "truth value" or a select statement for the condition. The CFG can be a tree graph connecting the BBs together. For a given software application program with one or more function calls, CFG 113 can build one or more intraprocedural CFGs for each of functions/procedures within the software program and CFG 113 can bridge the intraprocedural (or function-level) CFGs by the caller-callee relations to the functions to build an inter-procedural CFG for the software program. To resolve indirect calls to a function (such as through pointers), CFG 113 can perform Andersen's point-to analysis on pointers within the application program and to expand functions of any calls if the pointers point to function calls. Andersen's points-to analysis is a static code analysis that analyzes which pointers, or heap references, point to which variables. Pointers analysis can include analysis for four instruction types, for example, addressing of a variable, dereferencing of a pointer, copying of a pointer from one variable to another, and assigning through a pointer. In another embodiment, CFG 113 can also apply Andersen's point-to analysis to code with dynamic memory allocation, e.g., code associated with malloc or new memory operations.

In one embodiment, constraint-guided hybrid fuzzing module 110 may receive an application program source code from a client for a constraint-guided hybrid fuzzing. The source code can be used to generate executables which can be stored in memory 150 as part of program codes/executables 151. An initial seed input (as part of seed inputs 153) can be generated manually by an operator or automatically by system 100. The initial seed can include input values for a specific test case, or blank, dummy, or randomly generated values.

Figure 2:
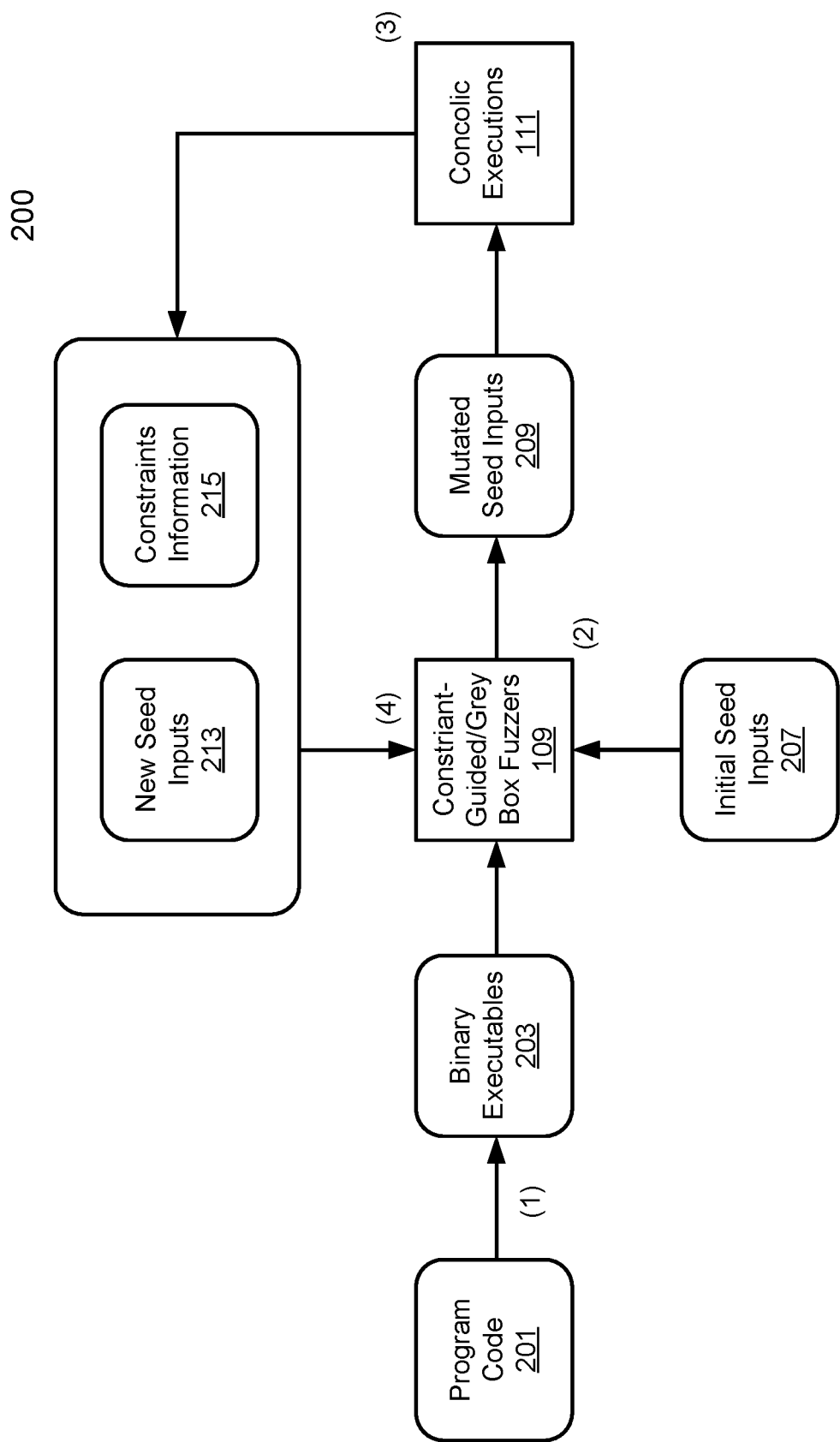
FIG. 2 is a block diagram illustrating a constraint guided hybrid fuzz operation flow according to one embodiment.

FIG. 2 is a block diagram illustrating a constraint guided hybrid fuzz operation flow according to one embodiment. Flow 200 illustrates the operation flow for a constraint-guided hybrid fuzzing. Flow chart 200 may be performed by processing logic which may include software, hardware, or a combination thereof. In one embodiment, flow 200 is performed by system 100 of FIG. 1. Referring to FIG. 2, processing logic receives program code 201. The program code can be any code for hybrid fuzz testing. The program code 201 can be source codes in any programmable languages (C, C++, Java™, Python™, Objective-C™, JavaScript®, etc.).

At operation 1, a compiler invokes a fuzzing module to generate a binary executable from program code 201. The fuzz module adds instrumentations to the program code 201 to allow a fuzzer to detect code paths in the program code. In another embodiment, the same binary executable can be used by concolic execution or another binary executable is generated for concolic execution. Processing logic generates initial seed inputs 207 (as part of seed inputs 153 of FIG. 1).

At operation 2, processing logic performs a first iteration of grey box fuzzing based on the initial seed inputs 207. Here grey box fuzzer 109 mutates the initial seed inputs 207 to generate mutated seed inputs 209 (e.g., a first set of seed inputs). These generated seed inputs or seeds are then passed to concolic execution 111 for replays. In one embodiment, the grey box fuzzing 109 prioritizes the fuzzing over BBs based on identified vulnerabilities within the BBs. Here, a static analysis can be performed for the program code 201 to count the number of vulnerabilities within each BB and the fuzzing for the BBs can be prioritized by the number of vulnerabilities.

At operation 3, processing logic performs concolic execution 111 on one or more binary executables 203 based on the mutated seed inputs 209. Here, the concolic execution 111 replays the mutated seed inputs 209 to generate constraints information 215 and the constraints information 215 is analyzed to generate new seed inputs 213 (e.g., a second set of seed inputs, which can be unique from the first set). In one embodiment, the fuzzer 109 and concolic execution 111 are performed concurrently. In another embodiment, the fuzzer 109 and concolic execution 111 are performed consecutively.

At operation 4, processing logic feeds back the new seed inputs 213 (e.g., a second set of seed inputs) with their associated constraint information 215 to perform a modified greybox fuzzer 109 using the new seed inputs 213 (e.g., a second set of seed inputs) with their associated constraint information 215 to guide subsequent seed mutations based on the constraint information 215. Here, modified greybox fuzzer 109 causes the constraint-guided seed mutations to be immutable for some portions of the seed inputs (based on the constraints information) while the rest of the seed inputs are mutated so the subsequent mutations only mutate the mutable portions. This way, modified greybox fuzzer 109 will only mutate seed inputs but not the constraints. Because the constrained-guided seed input mutations will only mutate to generate new seeds that satisfy the constraints specified by constraint information 215, the fuzzing mutates and generates new seeds that would satisfy the constraints. For example, for a conditional "if" branch constrained to enter the "if" branch, only seeds that meet the constraints to enter the "if" branch is generated. In one embodiment, operations 3-4 can repeat iteratively until a predetermined time has elapsed or until the iterations reach a predetermined code coverage and/or vulnerability coverage.

Note, fuzzing or fuzz testing refers to an automated software application program testing technique that generates invalid, unexpected, or random data as seed inputs to a computer program. In one embodiment, fuzzing can monitor for thrown exceptions (e.g., catch/try) for the program. A fuzzer can be a black box, grey box, or white box fuzzer. A black box fuzzer treats an application program as a black box and the fuzzer is unaware of an internal structure of the program. A white box fuzzer has access to an internal structure of the program and can systematically explore different paths in the program based on the access, however, at a high cost of execution time because it takes a long time for analysis. Grey box fuzzers can utilize instrumentation to gather information about a structure of the program. For example, a grey box fuzzer can utilize a tracer to trace basic block transitions/branching for a seed input, thus, can indicate whether there are new branches in the source code being explored. Note that instrumentation refers to the ability to monitor or measure a level of performance, diagnose errors, and/or access trace information of an application program.

In one embodiment, fuzzing generates the seed inputs randomly. In another embodiment, fuzzing generates the seed inputs mutating existing seed inputs. A user configuration for fuzzing may select whether to generate seed inputs randomly or to modify existing seed inputs to generate additional seed inputs.

In one embodiment, processing logic keeps track of all the seed inputs. In another embodiment, processing logic discards seed inputs which do not uncover new vulnerabilities and/or code branches and only keeps seed inputs which explores unique branches and/or vulnerabilities.

Figures 3A, 3B:
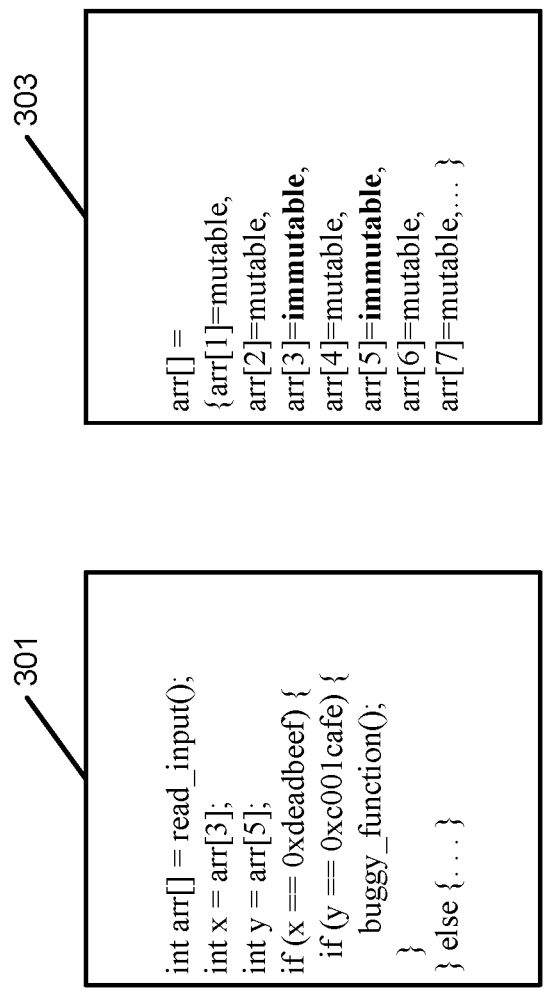
FIG. 3A is an example of a code snippet with constraints information according to one embodiment.
FIG. 3B is an example of an input for a constraint-guided hybrid fuzz for the code snippet of FIG. 3A according to one embodiment.
Figure 4:
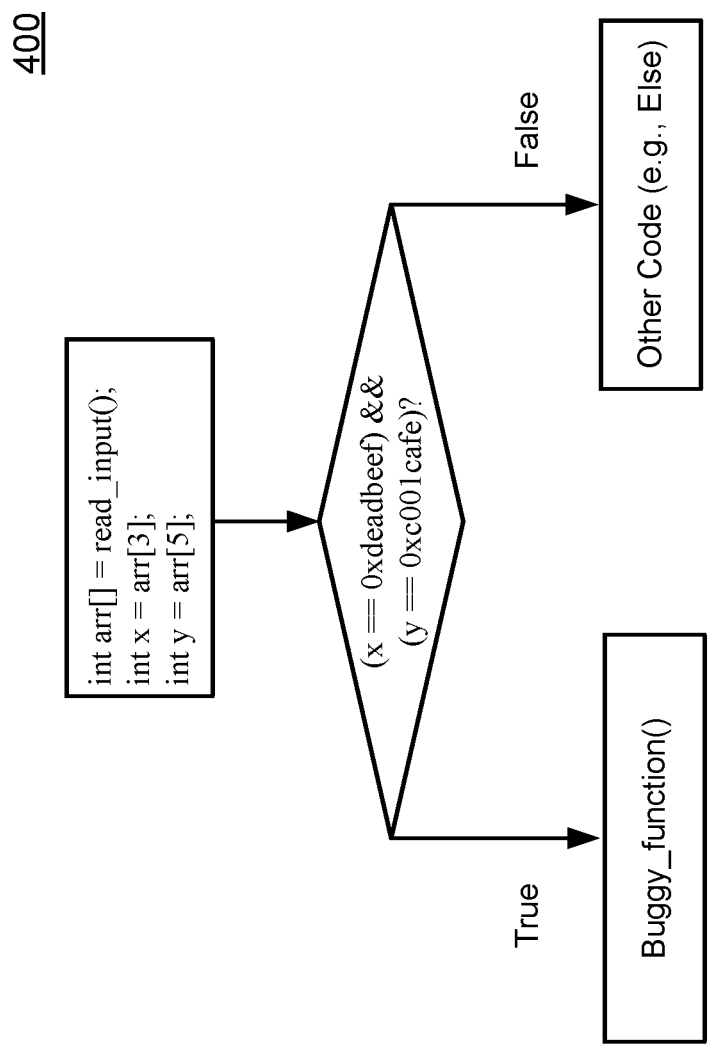
FIG. 4 is a block diagram illustrating a control flow graph of a program containing the code snippet of FIG. 3A according to one embodiment.

FIG. 3A is an example of a code snippet with constraint information according to one embodiment. FIG. 4 is a block diagram 400 illustrating a control flow graph of a program containing the code snippet of FIG. 3A according to one embodiment. Referring to FIG. 3A, c++ source code 301 is shown to have a data input "arr". Potential seed inputs can be any data array for arr. Here, an initial seed input can be arr[0]=0x0, arr[1]=0x0, arr[2]=0x0, arr[3]=0x0, arr[4]=0x0, arr[5]=0x0, arr[6]=0x0, arr[7]=0x0, which sets all bytes to zeros for fuzzing. The initial seed input can be mutated to generate new seeds for code coverage. The mutation can be based on random generation, bit flips, byte flips, swapping bytes, etc.

Concolic execution may replay the new seeds to inspect the code and determine a particular constraint to enter a specific branch of code, in this case, e.g., the conditions (or constraints) arr[3]=0xdeadbeef and arr[5]=0xc001cafe to enter buggy function( ). Concolic execution can then generate new seeds based on the determined constraints. E.g., a new seed input may be arr[0]=0x0, arr[1]=0x0, arr[2]=0x0, arr[3]=0xdeadbeef, arr[4]=0x0, arr[5]=0xc001cafe, arr[6]=0x0, arr[7]=0x0.

FIG. 3B is an example of an input for a constraint-guided hybrid fuzz for the code snippet of FIG. 3A according to one embodiment. Array 303 illustrates that data input "arr" includes immutable constraints for arr[3] and arr[5], in this case, arr[3]=0xdeadbeef and arr[5]=0xc001 cafe, for seed inputs to cause the executable to traverse buggy function( ) Here, referring to FIGS. 3A and 4, when the condition arr[3]=0xdeadbeef and arr[5]=0xc001cafe is satisfied, the fuzzing invokes program function buggy function( ) otherwise, other code e.g., "else" are invoked. Here, the fuzzing is instructed that portions of the inputs, e.g., arr[3] and arr[5], are immutable (or static) while the rest of the inputs are mutable by the fuzzer to cause subsequent seed mutations for seed inputs to traverse the buggy function( )subroutine. Although only one input data array is shown, any number and types of inputs, or combination thereof, can be used for the constraint-guided fuzzing.

Figure 5:
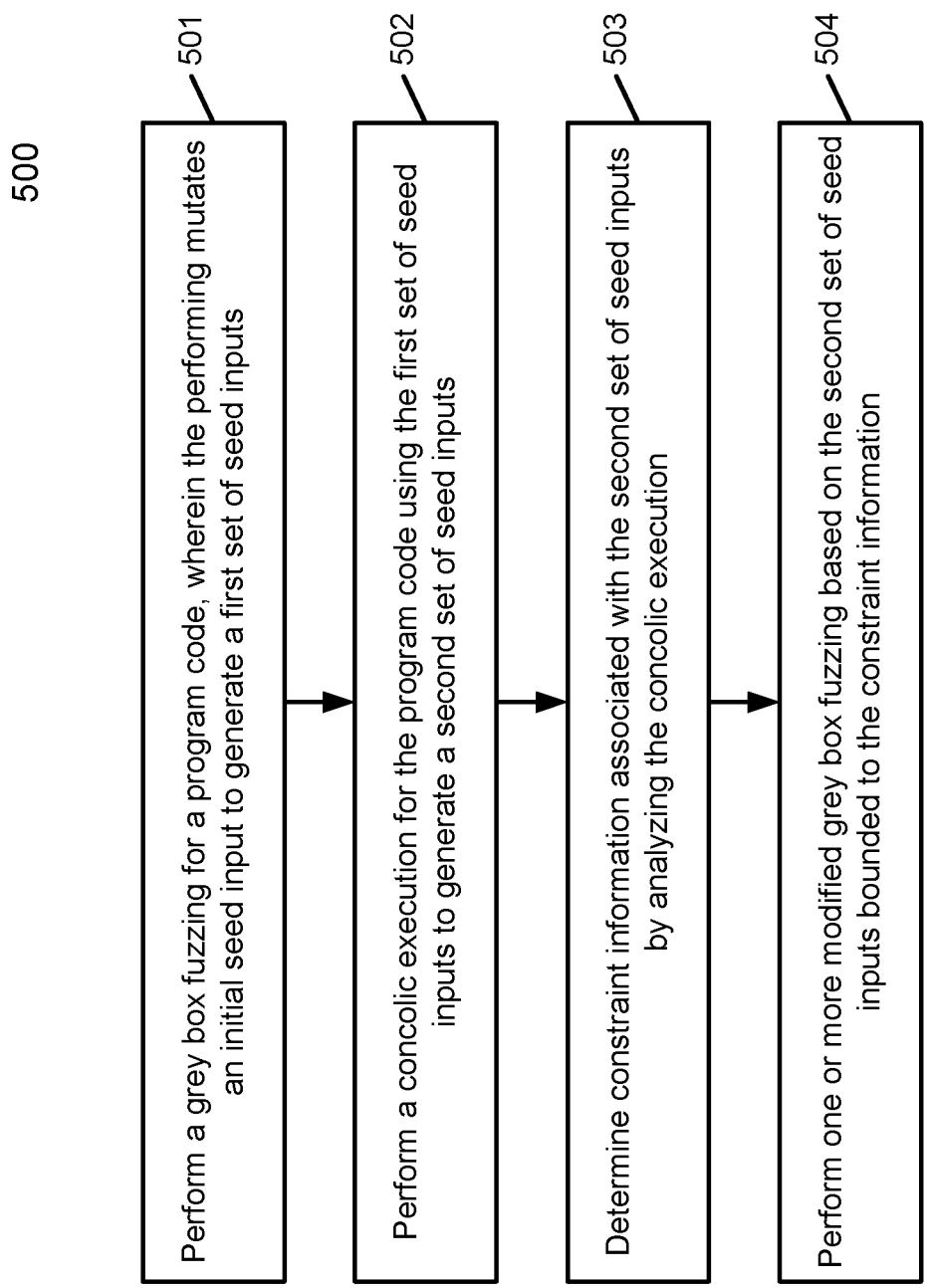
FIG. 5 is a flow diagram illustrating a method according to one embodiment.

FIG. 5 is a flow diagram illustrating a method according to one embodiment. Process 500 may be performed by processing logic which may include software, hardware, or a combination thereof. For example, process 500 may be performed by data processing system 100 of FIG. 1. Referring to FIG. 5, at block 501, processing logic performs a grey box fuzzing for a program code, where the performing mutates an initial seed input to generate a first set of seed inputs. At block 502, processing logic performs a concolic execution for the program code using the first set of seed inputs to generate a second set of seed inputs. At block 503, processing logic determines constraint information associated with the second set of seed inputs by analyzing the concolic execution. At block 504, processing logic performs one or more modified grey box fuzzing based on the second set of seed inputs bounded to the constraint information.

In one embodiment, the modified grey box fuzzing is a constraint-bounded grey box fuzzing where seed inputs for the constraint-bounded grey box fuzzing are bounded to the constraint information. In another embodiment, the constraint information includes immutable constraints.

In one embodiment, performing one or more modified grey box fuzzing based on the second set of seed inputs bounded to the constraint information includes mutating the seed inputs of the second set bounded to the constraint information to generate additional seed inputs. In one embodiment, the additional seed inputs are fed back as inputs to the concolic execution, where the concolic execution and the one or more modified grey box fuzzers are performed consecutively.

In one embodiment, processing logic further generates a first and a second binary executable for the program code, wherein the grey box fuzzing or the one or more modified grey box fuzzing is performed on the first binary executable. In one embodiment, performing the concolic execution on the program code includes performing the concolic execution on the first or the second binary executable.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for fuzz testing, the method comprising:
   performing a grey box fuzzing for a program code, wherein the performing mutates an initial seed input to generate a first set of seed inputs;
   performing a concolic execution for the program code using the first set of seed inputs to generate a second set of seed inputs;
   determining constraint information associated with the second set of seed inputs by analyzing the concolic execution; and
   performing one or more modified grey box fuzzing based on the second set of seed inputs bounded to the constraint information, wherein the one or more modified grey box fuzzing causes at least a portion of a seed input corresponding to the constraint information to be immutable while the rest of the seed input are mutable so subsequent mutations only mutate mutable portions.

2. The method of claim 1, wherein the modified grey box fuzzing is a constraint-bounded grey box fuzzing where seed inputs for the constraint-bounded grey box fuzzing are bounded to the constraint information.

3. The method of claim 2, wherein the constraint information includes immutable constraints.

4. The method of claim 1, wherein performing one or more modified grey box fuzzing based on the second set of seed inputs bounded to the constraint information comprises mutating the seed inputs of the second set bounded to the constraint information to generate additional seed inputs.

5. The method of claim 4, wherein the additional seed inputs are fed back as inputs to the concolic execution, wherein the concolic execution and the one or more modified grey box fuzzing are performed consecutively.

6. The method of claim 1, further comprising generating a first and a second binary executable for the program code, wherein the grey box fuzzing or the one or more modified grey box fuzzing is performed on the first binary executable.

7. The method of claim 6, wherein performing the concolic execution on the program code comprises performing the concolic execution on the first or the second binary executable.

8. A non-transitory machine-readable medium having instructions stored therein, which when executed by a processor, cause the processor to perform operations, the operations comprising:
   performing a grey box fuzzing for a program code, wherein the performing mutates an initial seed input to generate a first set of seed inputs;
   performing a concolic execution for the program code using the first set of seed inputs to generate a second set of seed inputs;
   determining constraint information associated with the second set of seed inputs by analyzing the concolic execution; and
   performing one or more modified grey box fuzzing based on the second set of seed inputs bounded to the constraint information, wherein the one or more modified grey box fuzzing causes at least a portion of a seed input corresponding to the constraint information to be immutable while the rest of the seed input are mutable so subsequent mutations only mutate mutable portions.

9. The non-transitory machine-readable medium of claim 8, wherein the modified grey box fuzzing is a constraint-bounded grey box fuzzing where seed inputs for the constraint-bounded grey box fuzzing are bounded to the constraint information.

10. The non-transitory machine-readable medium of claim 9, wherein the constraint information includes immutable constraints.

11. The non-transitory machine-readable medium of claim 8, wherein performing one or more modified grey box fuzzing based on the second set of seed inputs bounded to the constraint information comprises mutating the seed inputs of the second set bounded to the constraint information to generate additional seed inputs.

12. The non-transitory machine-readable medium of claim 11, wherein the additional seed inputs are fed back as inputs to the concolic execution, wherein the concolic execution and the one or more modified grey box fuzzing are performed consecutively.

13. The non-transitory machine-readable medium of claim 8, wherein the operations further comprise generating a first and a second binary executable for the program code, wherein the grey box fuzzing or the one or more modified grey box fuzzing is performed on the first binary executable.

14. The non-transitory machine-readable medium of claim 13, wherein performing the concolic execution on the program code comprises performing the concolic execution on the first or the second binary executable.

15. A data processing system, comprising:
   a processor; and
   a memory coupled to the processor to store instructions, which when executed by the processor, cause the processor to perform operations, the operations including performing a grey box fuzzing for a program code, wherein the performing mutates an initial seed input to generate a first set of seed inputs;
   performing a concolic execution for the program code using the first set of seed inputs to generate a second set of seed inputs;
   determining constraint information associated with the second set of seed inputs by analyzing the concolic execution; and
   performing one or more modified grey box fuzzing based on the second set of seed inputs bounded to the constraint information, wherein the one or more modified grey box fuzzing causes at least a portion of a seed input corresponding to the constraint information to be immutable while the rest of the seed input are mutable so subsequent mutations only mutate mutable portions.

16. The system of claim 15, wherein the modified grey box fuzzing is a constraint-bounded grey box fuzzing where seed inputs for the constraint-bounded grey box fuzzing are bounded to the constraint information.

17. The system of claim 16, wherein the constraint information includes immutable constraints.

18. The system of claim 15, wherein performing one or more modified grey box fuzzing based on the second set of seed inputs bounded to the constraint information comprises mutating the seed inputs of the second set bounded to the constraint information to generate additional seed inputs.

19. The system of claim 18, wherein the additional seed inputs are fed back as inputs to the concolic execution, wherein the concolic execution and the one or more modified grey box fuzzing are performed consecutively.

20. The system of claim 15, wherein the operations further comprise generating a first and a second binary executable for the program code, wherein the grey box fuzzing or the one or more modified grey box fuzzing is performed on the first binary executable.

21. The system of claim 20, wherein performing the concolic execution on the program code comprises performing the concolic execution on the first or the second binary executable.

* * * * *